Aug. 4, 1959 — E. P. STUCKA — 2,898,048
CONTROL APPARATUS
Filed June 6, 1956 — 2 Sheets-Sheet 1

INVENTOR.
EDWARD P. STUCKA
BY Joseph E. Ryan
ATTORNEY

Aug. 4, 1959 E. P. STUCKA 2,898,048
CONTROL APPARATUS
Filed June 6, 1956 2 Sheets-Sheet 2
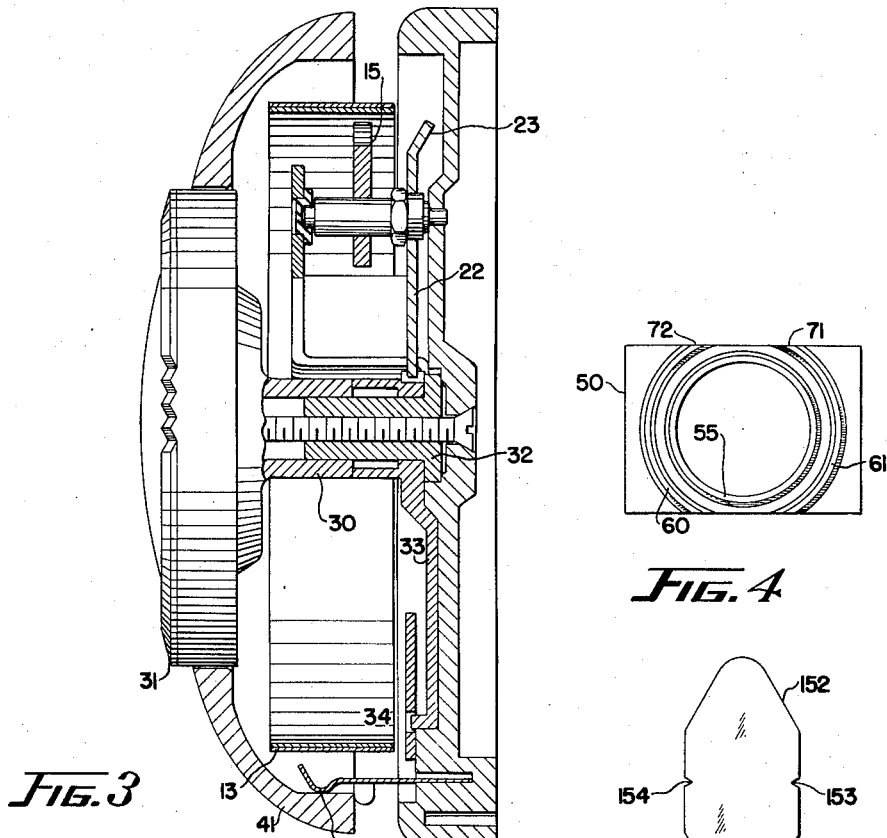
FIG. 3
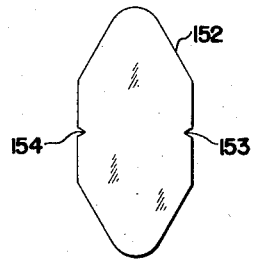
FIG. 4
FIG. 6
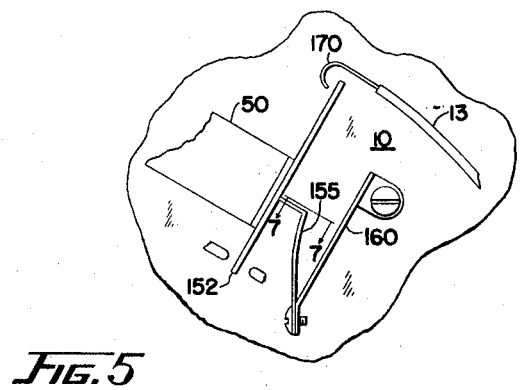
FIG. 5
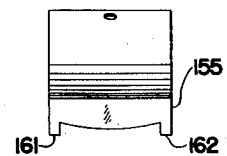
FIG. 7
INVENTOR.
EDWARD P. STUCKA
BY Joseph E Ryan
ATTORNEY

United States Patent Office 2,898,048
Patented Aug. 4, 1959

2,898,048

CONTROL APPARATUS

Edward P. Stucka, Deerfield, Ill., assignor to Minneapolis-Honeywell Regulator Company, Minneapolis, Minn., a corporation of Delaware Application June 6, 1956, Serial No. 589,771

3 Claims. (Cl. 236—87)

The present invention is concerned with an improvement in pneumatic thermostats, in particular a thermostat having a bleed valve comprising a seating surface and a flapper engaging such to close the valve. One extremity of the flapper is connected to a temperature responsive device for pivoting the flapper about a pivot point near its opposite extremity to open the valve.

There is a need for an inexpensive, reliable and easy to manufacture, pneumatic thermostat. In the past, one of the most expensive items as far as manufacture of thermostats of this type is concerned has been the valve means which is used to exhaust the air from a line connected to associated operating equipment. The present thermostat has a simple valve means comprising a seating surface with a circular raised portion and a pair of pivot points. The raised portion of the pivot points are ground to have the same height. A flat flapper is then held against the raised portion and pivot points by associated spring clips to seal off the port. To open the valve the flapper is engaged at an extremity some distance from the center of the port so that the flapper pivots on the aforementioned pivot points to raise it off the seat. This simple valve has only one operating part which adds to ease in assembly which is a highly important item in reducing the cost of the mass produced item.

It is therefore an object of the present invention to provide an improved pneumatic thermostat;

It is another object of the present invention to provide in a pneumatic thermostat an improved, inexpensive, and reliable valve means;

It is still another object of the present invention to provide in a pneumatic thermostat a valve means having a seating surface and an associated closure member, the closure member being held by a resilient member against the seating surface to prevent unlimited movement of the member, the flapper being raised from the seating surface by pivoting it near one extremity when a force is applied to its opposite extremity. These and other objects will become apparent upon the study of the specification and drawings of which:

Figure 3 is a side cutaway view of the thermostat shown in Figure 1 with its cover and adjusting knob thereon;

Figure 4 is a view of the valve seating surface looking directly into the valve port;

Figure 5 is another embodiment of the valve apparatus for use in the thermostat of Figures 1 and 3;

Figure 6 is a front view of the valve flapper shown in the valve embodiment of Figure 5;

Figure 7 is a front view of the flapper retaining spring of the valve embodiment shown in Figure 5.

Figure 1:
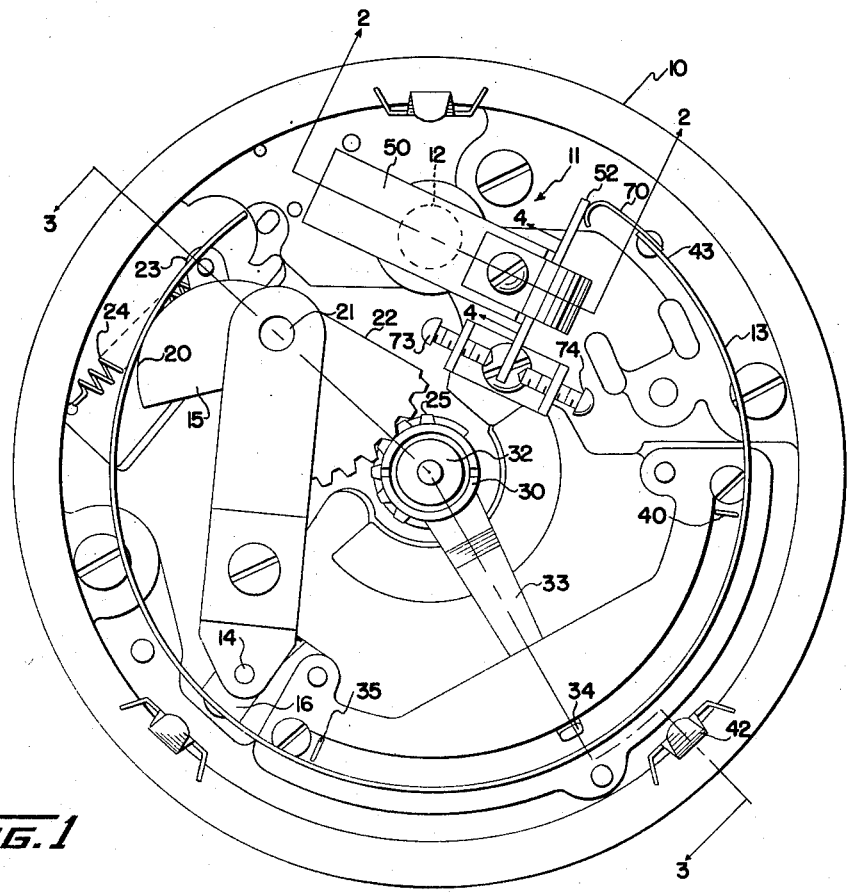
Figure 1 is a front view of the present invention with the cover and adjusting knob removed.

A thermostat of the type as shown in Figure 1 may have several uses one of which is in a self contained ventilating system where a duct damper or valve is controlled upon receiving air from the duct itself. By controlling the bleed rate of air from the control line the damper is operated.

Mounted on the thermostat base 10 is a bleed valve 11 having a port 12 which would be connected to the control line of the self contained damper. The rate of bleed and thus the open position of the valve 11 is controlled by a temperature responsive device or bimetal 13.

The bimetal 13 is of a circular type connected at a point between its extremities to a bracket 16 which is pivotally connected to the base member 10 by a pin 14. One extremity of bimetal 13 is adjusted in position by a cam 15 having its semicircular surface 20 engaging the bimetal. This cam is pivotally mounted to the base member by a pin 21. Integral with the cam and also pivoted on shaft 21 is a gear sector 22. The gear sector has an ear 23 attached thereto opposite the pivot point from its gear teeth. Ear 23 has a spring 24 connected thereto with its opposite end connected to base member 10 so that the gear sector and cam are biased in a counterclockwise direction to take out any possible backlash.

Gear sector 22 engages a gear sector 25 attached to a shaft 30 of an adjusting knob 31. Shaft 30 is splined on a shaft 32 suitably connected to the base member and protruding therefrom. A projecting arm 33 is integral with shaft 30 and limits the operation of the movement of the adjusting knob 31 as an end portion 34 of arm 33 engages stops 35 and 40. A cover 41 as shown in Figure 3 is suitably attached to base member 10 by associated clip 42.

By the adjustment of knob 31 the position of gear sector as well as cam 15 is selected. This positions the one extremity of the bimetal with respect to pivot point 14 so that the movement of the opposite end 43 of the bimetal has a predetermined range for a selected temperature range. By the proper design of the components end 43 of the bimetal is adjusted so that it will move through a range of two or three degrees to provide complete operation of valve 11.

Figure 2:
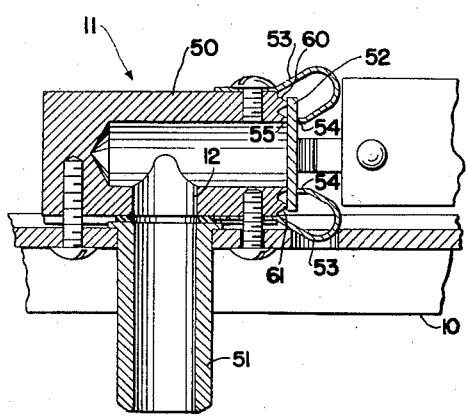
Figure 2 is a cutaway view of the thermostat valve.

Referring to Figure 2, valve 11 is shown in detail. Valve casting 50 is suitably connected by associated screw to base member 10 so that hole 12 aligns with a pipe 51. A flapper 52 is held against the sealing surface of valve casting 50 by means of a pair of spring clips 53. These clips are so designed that they hold the flapper against the seating surface as well as to prevent its movement away from the seated surface in any direction unless it is so moved by bimetal 13. The ends 54 of spring clips 53 are pointed to be received in suitable indentations in flapper 52 to assist in holding the flapper on the valve seat.

It is readily seen that the valve is relatively simple in that it has only one operating member, the flapper 52. As to the assembly of the valve, it need only be screwed to the base member after placing the clips 53 thereon. The flapper is snapped in place and the valve is ready for operation.

The seating surface of casting 50 as shown in Figure 4 has a continuous circular shaped, knife edge, raised portion 55 surrounding the valve port 12. A second and third knife edge raised portions 60 and 61 of an arcuate shape are positioned on opposite sides of the first mentioned knife edge seating surface 55. The raised portions are formed in the valve casting 50 and then ground to be assured of perfect flatness so that upon the application of flapper 52 to the seating surface a proper seal off of the port is provided. The arcuate raised portions 60 and 61 provide for support to the flapper when in the closed position to prevent it from teetering on the main seating surface 55. The extreme ends of portions 60 and 61 also provide for the pivot points when the flapper is raised off of the valve seat. A cross sectional view of the seat shown in Figure 2 shows the knife edged portion 55 as well as the arcuate knife edge portions 60 and 61 in more detail. By such a seating surface the area of the flapper and valve seat is reduced to reduce the possibility of dirt and foreign particles depositing between the flapper and the seat to prevent its proper seal-off.

The upper extremity of flapper 52, referring to Figure 1, is engaged by a spring 70 attached to the extremity 43 of the bimetal. Thus, when the thermostat is used as a heating thermostat and the temperature of the space in which it is mounted drops bimetal 13 will warp so that spring 70 pushes on the upper extremity of flapper 52 to rock the flapper on the pivot points 71 and 72, as shown in Figure 4, of the seating surface. This will open the valve to allow air to escape from port 12. A suitable limit is provided by screws 73 and 74 which can be adjusted to engage the opposite extremity of flapper 52 to limit its opening movement. It is obvious to one skilled in the art that a suitable spring clip such as 70 attached to the bimetal engaging the opposite side of the flapper to provide for reverse movement of the flapper and thus pivoting it about the opposite ends of the arcuate portions 60 and 61 would provide a thermostat for a cooling application. To have a spring attached to the bimetal 13 so that it rocked the flapper in both directions provides for the thermostatic control of the bleed valve 11 in both a direct and reverse operation. This possibly would have some use in an automatic changeover system where both heating and cooling were controlled by the associated equipment attached to the thermostat.

Referring to Figure 5, a second embodiment of the valve 11 is shown. This valve has a valve casting 50 which has a seating surface substantially the same as that shown in Figures 2 and 4. A flapper 152 engages the seating surface. The flapper, as shown in Figure 6, has a pair of notches 153 and 154 on opposite sides for receiving spring 155. This spring is connected to a suitable bracket 160 connected to the base and provides the biasing force to hold the flapper against the seating surface as well as to keep it in its position. Spring 155 as shown in Figure 7, has a pair of ears 161 and 162 which hold the flapper as they are placed in their associated notches 153 and 154.

With the valve shown in Figure 5, the operation of the thermostat is substantially as shown in that bimetal 13 upon a change in its temperature will teeter the flapper 152 about the lower extremity of arcuate members 60 and 61 so that the valve opens. As shown in Figure 5, the spring 170 provides for a reversed action from that accomplished by the disclosure of Figure 1.

It is obvious that the valve embodiment shown in Figure 5 has similar advantages as that shown in Figure 1 in that it has a small number of operating parts and can be readily assembled, this being an important feature in pneumatic thermostat designs of this type. While the invention has been described in some detail in the aforementioned specification it is intended that the scope of the present invention be limited by the appended claims.

I claim:

1. In a controller, condition responsive means, valve means, said valve means comprising a member having an exhaust port, a seating surface surrounding said port, said surface having a knife edge-like raised portion, a valve seating member for engaging said raised portion to close off said valve, a raised portion concentric said seating member having at least two pivot points slightly removed from said seating surface, said points having the same height as said raised portion so that said seating member engages said points and said raised portion simultaneously, spring means for biasing said seating member against said seating surface, and means connecting said condition responsive means to an extremity of said seating member so that upon a need of operation of said valve means said seating member is pivoted about said points to provide an opening between said member and said raised portion.

2. In a pneumatic control device adapted to control the air pressure in a line, a condition responsive means, a member containing an air exhausting port with a raised, knife edge seating surface around said port, a second raised knife edged surface substantially surrounding said seating surface, a closure member for simultaneously engaging said seating surface and said second surface to seal off said port, said closure member being adapted to pivot about at least two points of contact on said second surface, resilient means associated with said closure member for biasing said closure member downward against said seating surface and for restricted movement of said member with respect to said seat, and means connecting said condition responsive means to one end of said closure member so that upon operation of said condition responsive means said closure member is pivoted and lifted off of said seat.

3. In a pneumatic control device, a valve comprising; a member having an exhaust port therein, a knife edge seating surface surrounding said port, at least two arcuate raised surfaces on the outermost side of said seating surface, said raised surfaces having an upper edge plane to said seating surface, a seating member adapted to engage said seating surface and being stabilized by said raised surfaces, and spring means engaging said seating member on opposite sides of said port; a condition responsive means; and means connecting said condition responsive means to one end of said seating member to rock it about said raised surface and off of said seating surface.

References Cited in the file of this patent

UNITED STATES PATENTS

| | | |
|---|---|---|
| 1,942,837 | Schultheiss | Jan. 9, 1934 |
| 2,106,929 | McClure | Feb. 1, 1938 |
| 2,284,457 | Van Nest | May 26, 1942 |
| 2,310,293 | Joesting | Feb. 9, 1943 |
| 2,639,139 | Carlson | May 19, 1953 |
| 2,651,468 | Joesting | Sept. 8, 1953 |